United States Patent [19]
Krumm

[11] 3,766,866
[45] Oct. 23, 1973

[54] THERMAL WASTE CONVERTER

[75] Inventor: Eugene D. Krumm, Wellsville, N.Y.

[73] Assignee: The Air Preheater Company, Inc., Wellsville, N.Y.

[22] Filed: Mar. 13, 1972

[21] Appl. No.: 234,093

[52] U.S. Cl.................... 110/8 R, 110/11, 110/15
[51] Int. Cl. ............................................. F23g 5/12
[58] Field of Search.................. 110/7, 8 R, 11, 15, 110/18

[56] References Cited
UNITED STATES PATENTS

| | | | |
|---|---|---|---|
| 3,697,256 | 10/1972 | Engle | 110/15 |
| 3,303,798 | 2/1967 | Kartinen | 110/11 |
| 3,668,077 | 6/1972 | Ban | 110/15 |
| 3,618,537 | 11/1971 | Bogue | 110/18 X |

Primary Examiner—Kenneth W. Sprague
Attorney—Wayne H. Lang et al.

[57] ABSTRACT

A waste material converter having a primary chamber for the pyrolysis of waste material and a secondary chamber for the combustion of pyrolyzed gas and airborne combustible matter that is generated in the primary combustion chamber. The secondary combustion chamber also serves as a high temperature slagging furnace for the reduction of solid residual wastes from the primary combustion chamber using heat of the pyrolyzed gas.

7 Claims, 1 Drawing Figure

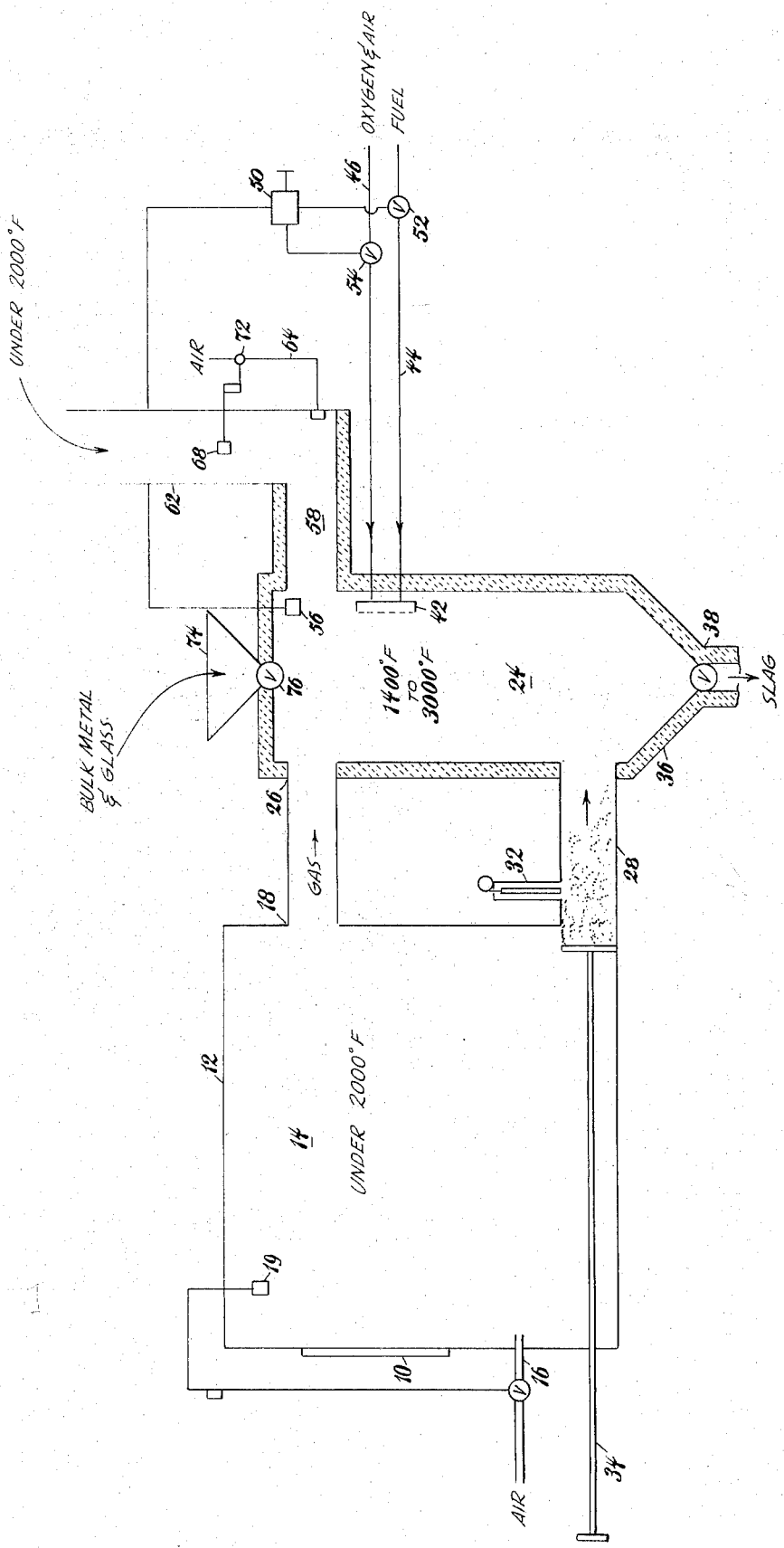

THERMAL WASTE CONVERTER

BACKGROUND OF THE INVENTION

1. Field of the Invention

This invention relates to apparatus for the total conversion of waste material, and more particularly it relates to thermal conversion apparatus that operates at temperatures above the slag melting limit whereby waste materials of all types including the normally considered non-combustible components thereof are thermally converted to gases or reduced to a molten slag.

2. Description of Prior Art

While it is already known in the art that general wastes including glass and metal may be disposed of in high-temperature or "slagging" type incinerators, the advantages of combustion at slagging temperatures are accompanied by certain obvious technical and economic difficulties. Nevertheless, general wastes may be theoretically disposed of at high temperatures to eliminate sorting, grading and the secondary treatment of all residues. Furthermore, dust or fly ash formation is reduced and the more stringent regulations of recent air pollution codes can be easily met. Additionally, these residues create a minimum volume slag that comprises a commercially acceptable aggregate for use in a general line of building materials, or the slag may be further reduced to its basic constituents to result in total conversion of waste material to its elemental form.

Although past devices have been operated successfully in small laboratory type installations, they have not proved satisfactory for large, "in-service" type operations. Such apparatus was extremely complex, highly critical and not economically competitive with the more common low temperature incinerators and land-fill type operations. Moreover, it has been previously deemed necessary to design a complete incinerator system as a high-temperature unit so that it would make obsolete presently acceptable pyrolyzing incincerators of the type defined by U.S. Pats. No. 3,491,707 and No. 3,595,181 and it would thus eliminate experience gained in pyrolyzing or low-temperature incinerator art.

SUMMARY OF THE INVENTION

The present invention is accordingly directed to a high-temperature refuse converter that would utilize a primary combustion chamber for the reduction of waste material to combustible gas and a standard type ash or residue. Accordingly, an independent secondary combustion chamber would be coupled with any standard type low-temperature or "pyrolyzing" type incinerator to receive the gases produced in the primary chamber in the manner of an afterburner and subject them to the high temperature heat of combustion. The secondary combustion chamber would also serve as a slagging furnace adapted to receive ash, glass, foil and other non-combustible materials from the primary chamber and from an independent outside source to collectively reduce them to a molten form utilizing gas generated in the primary chamber. When not functioning as a slagging furnace the secondary combustion chamber would be continuously operated as simple element of the exhaust ductwork housing a conventional afterburner that would burn the combustible fumes and eliminate all odors.

With the foregoing in mind, it is the primary objective of this invention to provide a high-temperature converter that utilizes the combustible constituents of waste material to reduce the non-combustible constituents thereof to a molten form. Another objective of this invention is to provide a high-temperature afterburner that operates in conjunction with a "starved-air" or pyrolyzing incinerator of conventional form. It is another objective of my invention to provide a high temperature incinerator that is relatively small in size, simple to construct and economical to operate. Still another objective of this invention is to provide a simple housing arrangement for the addition to an existing incinerator of the pyrolyzing or starved-air type by which it may be upgraded to comply with the current state of the art.

A BRIEF DESCRIPTION OF THE DRAWING

For a better understanding of the nature and objective of my invention, reference may be made to the following detailed description taken in conjunction with the accompanying drawing in which the single FIGURE is a schematic side elevation of an incinerator arrangement involving my invention.

DESCRIPTION OF THE PREFERRED EMBODIMENT

In an incinerator of the conventional starved-air type, trash or waste refuse to be burned is loaded through an opening 10 in housing 12 that encloses chamber 14. Air in an amount sufficient for pyrolyzation of the waste in chamber 14 is supplied through air inlet duct 16 from a conventional source. Air being supplied for combustion through duct 16 is continuously controlled by a valve 17 that responds to a thermocouple 19 in order that the temperature in chamber 14 is kept under 2,000° F. within the so-called pyrolyzing range. An exhaust port 18 is provided at the upper extremity of the housing whereby gases produced by the partial combustion or pyrolysis of fuel may be exhausted therefrom.

The housing of the incinerator 12 or pyrolyzer may be disposed either vertically or horizontally in order that best use is made of the available space. Ash that results from pyrolyzing the wastes collects at the bottom of the incinerator and, after being allowed to cool, is removed and usually disposed of in a "landfill" type operation.

Although the volume of ash resulting from partial combustion of most wastes represents only from 10 percent to 30 percent of the original volume of the bulk waste, satisfactory disposal sites of the landfill type are becoming increasingly difficult to find, and the time and effort needed for ash disposal is considerable. Moreover, after the ashes are buried in a landfill type operation the constituents of the ash represent a commodity that is completely lost to the economic welfare of the community.

There are now approximately 12 concerns that manufacture from 1,500 – 2,000/year of the units as defined above. While their operation represents an advancement from the original concept of open burning, the difficulty of finding suitable landfill sites, the current trend toward the recycling of all waste and the utilization of all residues indicates that these incinerators will soon be phased out of operation to be replaced by total refuse conversion systems in which materials are reduced in volume by 95 percent – 98 percent. Moreover, no pollutants will be discharged into the atmosphere, thus avoiding environmental problems usually associated with incineration. Total refuse conversion systems also supply a usuable fuel gas and a fused metal and glass type slag which may be used as it is or further refined into its basic constituents.

In this invention I provide an arrangement by which conventional pyrolyzing incinerators of the starved-air type now in use may be easily upgraded to comply with the standards required for conversion systems as used in the current practice of "total conversion" or "recycling."

A slagging chamber 24 is accordingly adapted to receive gases produced in the primary or pyrolyzing chamber 14 by directing gases from exhaust port 18 to inlet 26 of the slagging chamber. Similarly the slagging chamber 24 is adapted to receive solid resiudes from the pyrolyzing chamber through a duct 28 in which control means 32 is operable between "full-closed" and "full-open" to preclude the passing of air except when when pyrolyzing chamber 14 is inactive. Means such as a manual push rod 34 are provided at the bottom of the primary chamber whereby the ash resulting from the pyrolysis of waste therein may be moved to the slagging chamber 24. The push rod 34 or similar apparatus permits ash, while still hot, to be moved from chamber 14 to chamber 24 immediately after pyrolysis of a charge of material in chamber 14 is complete without subjecting an operator to intense heat of the pyrolyzing chamber.

The slagging chamber 24 is well insulated with firebrick and high-temperature lagging 36 to enable it to operate continuously at temperatures that range from 2,000° F. to 3,000° F., and it is provided with a suitable valving device diagrammatically shown at 38 by which slag produced therein may be drawn off.

The slagging chamber 24 houses a burner 42 having supply lines 44 and 46 by which fuel and oxygen enriched air may be directed thereto. Valves 52 and 54 in the lines to the burner may be adjusted to control the temperature of the chamber 24 to produce a slagging temperature of from 2,000° F. to 3,000° F., or approximately 1,400° F. necessary for an afterburner. The controller 50 is accordingly operated manually to provide an afterburner temperature (1,400° F.) or a slagging temperature (3,000° F.). A temperature responsive means 56 acting through controller 50 then activates valves 52 and 54 so that the temperature in chamber 24 may be maintained at a predetermined level when considerable combustible gas is being supplied from the pyrolyzing chamber to supplement that provided by supply line 46.

A gas outlet duct 58 from the slagging chamber leads to an exhaust stack 62 by which non-combustible gases may be exhausted to the atmosphere. A supply of cooling air 64 is provided to the exhaust stack 62 and mixed with the hot exhaust gases to lower the temperature of said exhaust gases under 2,000° F. A thermocouple 68 of conventional design may be adapted to control valve 72 in the air supply line to provide the predetermined temperature.

A loading hopper 74 having a suitable control valve 76 may be adapted to supply an additional quantity of foil, metal, glass and non-combustible residue directly to the slagging chamber to supplement that which is provided from the primary chamber via duct 28, and suitable charging means (not shown) may be provided to provide a flux material thereto.

The relative size of the slagging chamber 24 and the pyrolyzing chamber is not deemed critical. The size of the chamber 24 may accordingly vary from an extremely small housing with a capacity much less than that of chamber 14 enabling it to receive ashes or solid residual matter from the pyrolysis of only a single charge in chamber 14 to a housing having a capacity as large or even larger than that of pyrolyzing chamber 14.

If the slagging chamber 24 is relatively large, it need be operated only occasionally as a high temperature slagging furnace, although it continues to serve constantly as an afterburner for the gas produced in the chamber 14.

In operation, the pyrolyzing chamber 14 reduces a charge of waste material to gas and ash, while the gas so produced is burned in the chamber 24 at approximately 1,400° F. Residue valve 32 is moved to an open position and the ash at the bottom of chamber 14 is pushed into the slagging chamber 24 by push rod 34. The valve 32 is then closed and a charge of waste material is again placed in pyrolyzing chamber 14 and ignited, and the pyrolyzed gas is burned in chamber 24 as a simple afterburner at approximately 1,400° F.

After such waste is reduced to ash, the ash is again moved into the slagging chamber through duct 28 and the pyrolyzing chamber is immediately again filled with waste and subjected to pyrolysis. Repeated charges are handled similarily until a predetermined amount of ash in the slagging chamber 24 indicates that a slagging operation is required.

On such an occasion, the pyrolyzing chamber 14 is filled with waste material and ignited to burn under conditions of pyrolysis. The effluent gas produced thereby leaves exit 18 and enters port 26 to the slagging chamber where it is again ignited by burner 42. Gas generated in the pyrolyzing chamber 14 accordingly is burned in the slagging chamber 24, along with oxygen enriched air and fuel in burner 30 to bring the chamber to approximately 3,000° F. at which point the ash, glass and metal will liquify anf form a molten slag.

When molten, the slag is accordingly drawn off through an outlet valve 38 and may be used as is for a concrete aggregate or may be still further refined to its basic components.

As an afterburner for gases alone, the temperature of chamber 24 need be raised only to 1,400° F. to 2,000° F. Thus, by manipulation of the control valve, air and fuel to burner 42 is limited to that required to obtain the proper temperature. Similarly, by turning the control valve 50 to a full-open position, the temperature in the chamber may be raised to the approximately 3,000° F. needed for the slagging of solid residual wastes. Heat responsive means 56 may be connected to control means 50 to provide a further modulation of the valve means 52 and 54 to complement gas supplied by pyrolysis in the primary chamber and provide either a predetermined afterburner temperature (1,400° F.) or a slagging temperature (3,000° F.).

It is evident that various changes may be made without departing from the spirit of the invention, and it is intended that all matter contained in the above description or shown in the accompanying drawings shall be interpreted as illustrative and not in a limiting sense.

I claim:

1. Apparatus for the recycling of waste material having a pyrolyzing chamber for the gasification of waste material including an inlet for the waste and an outlet for the gas produced therefrom, an independent secondary chamber having an inlet for gas from the pyrolyzing chamber and an outlet for gases of combustion, means connecting the outlet of the pyrolyzing chamber to the inlet of the secondary chamber, means directing solid residues from the pyrolyzing chamber to the secondary chamber, and a burner in said secondary chamber that burns combustible gas produced in the pyrolyzing chamber to reduce the solid residue in the secondary chamber to a molten condition.

2. Apparatus for the recycling of waste material as defined in claim 1 including an independent source of fuel and air connected to said burner in the secondary chamber, and means regulating the air and fuel to provide a range of temperature in the secondary chamber.

3. Apparatus for the recycling of waste material as defined in claim 2 wherein the range of temperature provided by the burner of the secondary chamber extends from 1,200° F. to 3,000° F.

4. Apparatus for the recycling of waste material as defined in claim 3 including an outlet for gases exhausting from the secondary chamber, and means for supplying a quantity of cool air to the gases exhausting from the secondary chamber sufficient to lower their temperature.

5. Apparatus for the recycling of general waste material as defined in claim 1 including an exhaust stack connected to the outlet of the secondary chamber, and a supply of air connected to said stack for cooling the hot gases that exhaust from the secondary chamber.

6. Apparatus for the recycling of general waste material as defined in claim 1 including means controlling air flow into said exhaust stack whereby the gases exhausting to the atmosphere do not exceed 2,000° F.

7. Apparatus for the recycling of general waste material as defined in claim 1 including an independent inlet to the secondary chamber for the addition of noncombustible material thereto, and an outlet to said chamber for the removal of molten slag therefrom.

* * * * *